United States Patent [19]

Taniguchi et al.

[11] Patent Number: 4,493,787
[45] Date of Patent: Jan. 15, 1985

[54] SEMI-CONDUCTIVE COMPOSITIONS, BASED ON ETHYLENE-VINYL ACETATE COPOLYMERS, HAVING ADHESION TO AND STRIPPABILITY FROM CROSSLINKED POLYOLEFIN SUBSTRATES

[75] Inventors: Seiho Taniguchi, Yokohama; Yuichiro Sakuma, Nagareyama, both of Japan

[73] Assignee: Union Carbide Corporation, Danbury, Conn.

[21] Appl. No.: 398,770

[22] Filed: Jul. 20, 1982

[30] Foreign Application Priority Data

Oct. 8, 1981 [JP] Japan .................................. 56-159446

[51] Int. Cl.$^3$ ............................................... H01B 1/06
[52] U.S. Cl. ............................. 252/511; 174/102 SC; 174/102 SP
[58] Field of Search ............... 252/511; 174/102 SC, 174/102 SP, 120 SC; 524/495, 496

[56] References Cited

U.S. PATENT DOCUMENTS

| | | | |
|---|---|---|---|
| 3,849,333 | 11/1974 | Lloyd et al. | 252/511 |
| 4,244,861 | 1/1981 | Spenadel | 252/511 |
| 4,250,075 | 2/1981 | Monroe | 252/511 |

FOREIGN PATENT DOCUMENTS 2723488 11/1978 Fed. Rep. of Germany .

Primary Examiner—Josephine L. Barr
Attorney, Agent, or Firm—James C. Arvantes; R. C. Brown

[57] ABSTRACT

Semi-conductive compositions, based on ethylene-vinyl acetate copolymers or chlorinated products thereof, containing carbon black, a silicone compound and an interface crosslink inhibitor, such as a phenol, a quinone, a thiazole or a thiuram sulfide, which find utility as semi-conductive layers about crosslinked polyolefin substrates of electrical conductors.

15 Claims, No Drawings

SEMI-CONDUCTIVE COMPOSITIONS, BASED ON ETHYLENE-VINYL ACETATE COPOLYMERS, HAVING ADHESION TO AND STRIPPABILITY FROM CROSSLINKED POLYOLEFIN SUBSTRATES

SUMMARY OF THE INVENTION

This invention relates to semi-conductive compositions, based on ethylene-vinyl acetate copolymers or chlorinated products thereof, which have adhesion to and strippability from crosslinked polyolefin substrates. The ethylene-vinyl acetate copolymer compositions of this invention containing carbon black, a silicone compound, and an interface crosslink inhibitor, can be extruded as semi-conductive layers about crosslinked polyolefin substrates of electrical conductors.

BACKGROUND OF THE INVENTION

Insulated electrical conductors, i.e. wires and cables, designed for medium to high voltage applications, are generally constructed of a metal core conductor having arranged coaxially around the core conductor, in the order named, an internal semi-conductive layer, a crosslinked polyolefin insulation layer, an external semi-conductive layer, a metal shield layer and an outer protective sheath. Conventionally, the external semi-conductive layer is based on a composition containing an ethylene-ethyl acrylate copolymer or an ethylene-vinyl acetate copolymer, and carbon black. If it is desired to crosslink the external semi-conductive layer, an organic peroxide is added to the composition.

It is important, for the successful and rapid splicing of wires and cables, that the external semi-conductive layer be strippable from the insulation layer. In order to provide compositions which have adequate adhesion, coupled with strippability, it has been proposed to chemically modify the polymers of the compositions and/or add various additives thereto. For example, it is known that the adhesion between the crosslinked polyolefin insulation layer and the semi-conductive layer can be decreased by increasing the comonomer content, that is, the ethyl acrylate or vinyl acetate content of the ethylene-ethyl acrylate copolymers or of the ethylene-vinyl acetate copolymers, used in formulating compositions to be used as semi-conductive layers. It is also known that a desired level of strippability can be achieved by chlorinating the ethylene copolymers rather than by increasing the monomer content thereof.

As to additives, it is known that strippability of the semi-conductive layer from the crosslinked polyolefin insulation layer can be improved by the addition to the composition of the semi-conductive layer, of silicone oil such as liquid dimethyl polysiloxane.

These and other such measures, however, have not proved to be particularly effective. Compositions containing chlorinated ethylene copolymers exhibit inferior mechanical properties and poorer thermal stability when used as external semi-conductive layers of electrical power cables. Also, silicone oil is not completely compatible with ethylene copolymers and in time, oozes out of the compositions when used in amounts sufficient to improve strippability, generally in excess of 5 percent by weight. Furthermore, the addition of silicone oil, in amounts sufficient to improve strippability, degrades mechanical properties, particularly elongation, of the resultant composition.

Stripping of the external semi-conductive layer from the crosslinked polyolefin insulation layer has become a more pressing problem in view of more recent extrusion techniques. According to recent technology, insulated electrical conductors are manufactured by coextrusion by which three layers, the internal semi-conductive layer, the crosslinked polyolefin insulation layer and the external semi-conductive layer are extruded simultaneously, employing coaxial extruders, and subsequently cured in a single operation. In one aspect, this method of manufacture is advantageous in that it results in the close bonding of the three layers, eliminating partial delamination and void formation between layers, caused, during normal use, by flexure and heat. This, in turn, prevents corona deterioration and other insulation degradation. On the other hand, such a method of manufacture presents problems of strippability due to the high bond strength between the crosslinked polyolefin insulation layer and the external semi-conductive layer, caused by formation of crosslinking bonds across their interface.

As stated, it is important that the external semi-conductive layer adhere to the insulation layer, but it is also important that it can be stripped off relatively easy in a short period of time. For purposes of terminating a cable or for splicing a cable, for example, the external semi-conductive layer has to be removed from the insulation layer over a certain distance from the end of the cable.

DESCRIPTION OF THE INVENTION

The present invention provides semi-conductive compositions which, having a controlled degree of strippability, find utility as semi-conductive layers bonded to crosslinked polyolefin insulation layers of electrical wires and cables. Semi-conductive layers, extruded from the compositions of this invention, have adequate adhesion to the crosslinked polyolefin insulation layers of insulated conductors and have controlled strippability therefrom that permits the semi-conductive layer to be stripped from the insulation layer when necessary for installation, repair or splicing.

The compositions of this invention comprise an ethylene-vinyl acetate copolymer or chlorinated product thereof, carbon black, a silicone compound and an interface crosslink inhibitor which can be a phenol, a quinone, a thiazole or a thiuram sulfide.

The term ethylene-vinyl acetate copolymers as used in this specification denotes copolymers containing 15 to 30 percent by weight vinyl acetate and having a melt index of 1 to 50 g/10 min. as measured by ASTM test procedure D-1238. Suitable chlorinated ethylene-vinyl acetate copolymers are those having a vinyl acetate content and a melt index, as defined above, and containing 3 to 40 percent by weight chlorine.

Among carbon blacks which can be added to the compositions of this invention for the purpose of rendering the compositions semi-conductive are furnace black, acetylene black, channel black, Ketjen black and the like. Highly conductive blacks such as Ketjen black EC are preferred as lesser amounts are necessary in order to make the composition semi-conductive.

The term silicone compound as used in this specification encompasses silicone oils, silicone rubbers and silicone block copolymers which are liquid at normal temperatures.

Suitable silicone oils include any commercial silicone oils, particularly silicone oils which are polysiloxanes having viscosities of 6 to 100,000 centistokes at a temperature of 25° C.

Silicone rubbers, as used herein, encompass, among others, unvulcanized gummy siloxanes, filled or unfilled, having a molecular weight from 30,000 to 150,000 preferably 30,000 to 50,000.

Suitable silicone block copolymers contain the following repeating unit:

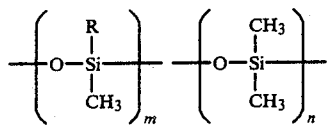

wherein R is a monovalent hydrocarbon radical or an oxy substituted hydrocarbon radical, generally having 2 to 30 carbon atoms inclusive, preferably having 2 to 18 carbon atoms inclusive and the sum of $m+n$ is at least 2. Generally, m is an integer of 1 to 100 and n is an integer of 3 to 200.

Illustrative radicals for R are alkyl radicals such as ethyl, n-propyl, isopropyl, n-butyl and the like; aryl radicals such as phenyl, benzyl and the like; alkoxy radicals illustrated by the residium of polyethylene glycol, polypropylene glycol and the like.

Specific silicone block copolymers are poly(stearyl methyl-dimethyl siloxane) block copolymer, poly(alkylene glycol methyl-dimethyl siloxane) block copolymer, poly(phenyl methyl-dimethyl siloxane) block copolymer and the like.

Exemplary of interface crosslink inhibitors used in the composition of the present invention are phenols such as 2,2'-methylene-bis-(4-methyl-6-t-butyl phenol), 2,6-di-t-butyl-4-methyl phenol, 4,4'-thio-bis-(6-t-butyl-2-methyl phenol) and t-butyl catechol; quinones such as hydroquinone and 2,5-di-t-butylhydroquinone; thiazoles such as 2-mercapto-benzothiazole, 2,2'-di-thio-bis-benzothiazole and N-cyclohexyl-benzothiazole-sulfeneamide; and thiuram sulfides such as tetramethyl thiuram disulfide.

Compositions of this invention are prepared using the materials in the amounts specified below, based on 100 parts by weight ethylene-vinyl acetate copolymer or chlorinated ethylene-vinyl acetate copolymer.

Carbon Black-amounts sufficient to render the composition semi-conductive, generally 40 to 100 parts by weight. The quantity may be reduced to 5 to 50 parts by weight in the case of highly conductive carbon black having a large surface area such as Ketjen black EC.

Silicone compounds-generally 0.3 to 5 parts by weight, preferably 0.3 to 2.5 parts by weight.

Interface crosslink inhibitors-generally 0.01 to 1.5 parts by weight. Under this range, sufficient effect is not obtained; and over this range, oozing occurs, with passage of time after molding.

The semi-conductive compositions of this invention can be crosslinked by organic peroxides such as di-α-cumyl peroxide, 2,5-dimethyl-2,5-di-(tertiary-butyl-peroxy)hexyne-3 and the like as further disclosed in U.S. Pat. Nos. 3,954,907 and 4,017,852.

It is to be understood that the semi-conductive compositions of this invention can contain other conventional additives, if desired, such as age resistors, processing aids, stabilizers, antioxidants, crosslinking boosters, fillers, pigments and the like, in amounts well known in the art.

Also, mixtures of materials noted can be used if so desired.

The semi-conductive compositions of this invention were prepared by admixing materials, in the amounts noted below:

| Formulation: | Parts by Weight |
| --- | --- |
| Ethylene-vinyl acetate copolymer or chlorinated ethylene-vinyl acetate copolymer | 100 |
| Carbon black | 65 |
| Polymerized 2,2,4-trimethyl-1,2-dihydroquinoline (antioxidant) | 0.8 |
| Lead stearate | 1 |
| Di-α-cumyl peroxide* | 1 |

*unless otherwise noted

Additions of silicone compound and interface crosslink inhibitors to this basic composition were as noted in the tables.

Compositions were then compression molded into sheets, 150 mm by 180 mm by 0.5 mm thick under the following conditions:

| Pressure | 85 kg/cm$^2$ |
| --- | --- |
| Temperature | 120° C. |
| Time of Molding Cycle | 10 minutes |

Sheets, 150 mm by 180 mm by 2.0 mm thick, were also formed as described above from a composition comprising polyethylene, antioxidant and di-α-cumyl peroxide wherein the antioxidant was present in an amount of 0.2 percent by weight and the di-α-cumyl peroxide was present in an amount of 2 percent by weight.

Laminates were prepared by placing a sheet formed from the semi-conductive composition, based on an ethylene-vinyl acetate copolymer, over a sheet formed from the polyethylene composition and laminating the sheets together, using a compression molder, under the following conditions:

| Pressure | 20 kg/cm$^2$ |
| --- | --- |
| Temperature | 180° C. |
| Time of Cycle | 15 minutes |

Test specimens, 100 mm by 120 mm, were punched from the laminated sheets and tested for strippability on a tensile testing machine. The two layers of each specimen were separated at a speed of 500 mm/min at a temperature of 23° C., the angle of the semi-conductive layer being 90° with respect to the polyethylene layer. Force required to separate the two layers was regarded as the "stripping strength" in terms of kg/10 mm.

Data with respect to compositions of this invention are set forth in Table I. Data with respect to "Controls" are set forth in Table II.

The phrase "having both adhesion and strippability" as used in this specification with respect to the compositions, means that a force of at least 0.3 kg/10 mm is required to remove the semi-conductive layer from the insulation layer. A semi-conductive layer that requires a stripping force under this limit is liable to separate from the insulation layer when the cable is bent during use, thus impairing insulation properties.

Abbreviations and symbols used in Tables I and II have the following meaning:

EVA—ethylene-vinyl acetate copolymer containing 28 percent by weight vinyl acetate and having a melt index of 6 g/10 min.

Cl-EVA—chlorinated ethylene-vinyl acetate copolymer containing 25 percent by weight chlorine prepared by chlorinating EVA.

Silicone—Compound A—silicone block copolymer having the following repeating unit:

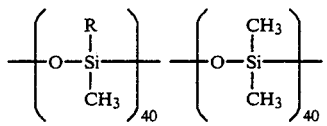

wherein R is a $C_{22}$ alkyl group.

Silicone—Compound B—silicone block copolymer having the following repeating unit:

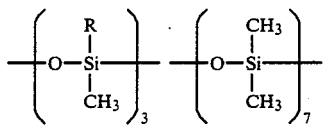

wherein R is the residium of polypropylene glycol.

Interface crosslink inhibitor X: 2,2'-methylene-bis(4-methyl-6-t-butylphenol)

Interface crosslink inhibitor Y: 2-mercapto-benzothiazole

Interface crosslink inhibitor Z: 4,4'-thiobis(6-t-butyl-2-methyl phenol)

"Broken" given in the column of stripping strength means that the specimen was broken before separation occured.

Marks "i" and "s" in the column of degree of crosslink mean that the specimen was insoluble and soluble, respectively, in hot toluene at 90° C.

Silicone rubber: unvulcanized silicone gum 201, product of Toshiba Silicone Co., Ltd.

Silicone oil: NUC Silicone Oil L-45, viscosity 2000 cs.; product of Nippon Unicar Co., Ltd.

The data of the tables show that in cases wherein the silicone compound was used alone, satisfactory strippability was not obtained. This was true regardless of the type of silicone compound and even though 3 parts by weight silicone compound were used, based on 100 parts by weight of polymer. When the silicone compound was used in amounts greater than 5 parts by weight, mixing, in the preparation of the composition, became difficult or the mechanical properties of the resultant composition were poorer.

When the interface crosslink inhibitor was used alone, strippability was still poor at 1.5 parts by weight and oozing occurred at this concentration.

These disadvantages were eliminated when the silicone compound and crosslink inhibitor were used in combination. Also, the combined use of these two components resulted in a reduction of the quantity added.

As a result of the synergistic effect of the combined use of the silicone compound and the crosslink inhibitor, strippability can be improved with less amount of additives. Not only does this decrease the cost of the semi-conductive composition but, in addition, provides the following unexpected results: absence of oozing of the additives to the surface of the composition, improvement in moldability, improvement of surface smoothness, decrease of staining of dies and molds and improvement of mechanical properties such as tensile strength and elongation.

TABLE I

EXAMPLES

Semiconductive resin composition (parts by weight)

| Ex. | Polymer 100 parts by wt. | Silicone compound Type | Silicone compound Q'ty | Interface crosslink inhibitor Type | Interface crosslink inhibitor Q'ty | Stripping strength (kg/10 mm) | Degree of crosslink | Elongation (%) | Remarks |
|---|---|---|---|---|---|---|---|---|---|
| 1 | EVA | A | 1.5 | X | 0.7 | 0.9 | i | 260 | |
| 2 | EVA | A | 1.5 | Y | 0.5 | 1.2 | i | 230 | |
| 3 | EVA | B | 1.5 | Z | 0.5 | 1.1 | i | 240 | |
| 4 | EVA | A + Rubber | 0.5 1.0 | Z | 0.5 | 1.1 | i | 160 | |
| 5 | EVA | B + Oil | 0.5 1.0 | Z | 0.5 | 1.2 | i | 180 | |
| 6 | EVA | A | 1.5 | X Y | 0.2 0.3 | 1.1 | i | 220 | |
| 7 | EVA* | A | 0.5 | X | 0.5 | 0.9 | i | 280 | |
| 8 | EVA* | B + Rubber | 0.5 1.0 | Y | 0.5 | 1.0 | i | 260 | |
| 9 | Cl-EVA | B | 1.5 | Z | 0.3 | 0.5 | i | 150 | |

TABLE II

CONTROLS

Semiconductive resin composition (parts by weight)

| Controls | 100 parts by weight | Silicone compound Type | Silicone compound Q'ty | Interface crosslink inhibitor Type | Interface crosslink inhibitor Q'ty | Stripping strength (kg/10 mm) | Degree of crosslink | Elongation (%) | Remarks |
|---|---|---|---|---|---|---|---|---|---|
| 1 | EVA | A | 3 | — | — | 2.4 | i | −t | |
| 2 | EVA | A | 7 | — | — | 1.5 | i | <100 | (1) |
| 3 | EVA | A | 10 | — | — | Broken | i | <100 | (1) |

TABLE II-continued

CONTROLS

| Con-trols | 100 parts by weight | Silicone compound Type | Silicone compound Q'ty | Interface cross-link inhibitor Type | Interface cross-link inhibitor Q'ty | Stripping strength (kg/10 mm) | Degree of crosslink | Elonga-tion (%) | Remarks |
|---|---|---|---|---|---|---|---|---|---|
| 4 | EVA | Rubber | 10 | — | — | Broken | i | <100 | (1) |
| 5 | EVA | Oil | 5 | — | — | —** | — | —** | (2) |
| 6 | EVA | B | 3 | — | — | 2.6 | i | −t | |
| 7 | EVA* | B | 7 | — | — | 1.2 | — | <100 | (1) |
| 8 | EVA | — | — | X | 1.0 | 3.5 | i | −t | |
| 9 | EVA | — | — | X | 1.5 | 2.6 | ε | −t | |
| 10 | EVA | — | — | Y | 1.0 | 3.0 | ε | −t | |
| 11 | EVA | — | — | Y | 2.0 | 2.3 | ε | −t | |
| 12 | EVA | — | — | Z | 1.0 | 2.8 | ε | −t | |
| 13 | EVA | — | — | Z | 1.5 | 2.5 | ε | −t | |
| 14 | EVA* | — | — | Z | 1.5 | 2.0 | — | −t | |
| 15 | Cl-EVA | A | 7 | — | — | Broken | i | −t | |

Remarks:
(1) Composition was dificult to mix.
(2) Composition was impossibe to mix.
Notes:
*Crosslinking agent not added.
**It was impossible to prepare specimens
t Data not measured.

What is claimed is:

1. A semi-conductive composition comprising an ethylene-vinyl acetate copolymer containing 15 to 30 percent by weight vinyl acetate and having a melt index of 1 to 50 g/10 min. or a chlorinated product thereof containing 3 to 40 percent by weight chlorine, carbon black, a silicone compound selected from the group consisting of silicone oils, silicone rubbers and silicone block copolymers which are liquid at normal temperatures, in an amount of about 0.3 to about 5 parts by weight and an interface crosslink inhibitor selected from the group consisting of a phenol, a quinone, a thiazole and a thiuram sulfide in an amount of about 0.01 to about 1.5 parts by weight, said parts by weight based on 100 parts by weight of said copolymer.

2. A composition as defined in claim 1 wherein said silicone is present in an amount of about 0.3 to about 2.5 parts by weight.

3. A composition as defined in claim 1 wherein the interface crosslink inhibitor is a phenol.

4. A composition as defined in claim 3 wherein the said phenol is 2,2'-methylene-bis(4-methyl-6-t-butyl phenol).

5. A composition as defined in claim 3 wherein the phenol is 4,4'-thio-bis(6-t-butyl-2-methyl phenol).

6. A composition as defined in claim 1 wherein the interface crosslink inhibitor is a thiazole.

7. A composition as defined in claim 6 wherein the said thiazole is 2-mercapto-benzothiazole.

8. A composition as defined in claim 1 wherein the silicone compound contains the repeating unit:

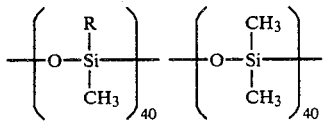

wherein R is a $C_{22}$ alkyl group.

9. A composition as defined in claim 1 wherein the silicone compound contains the repeating unit:

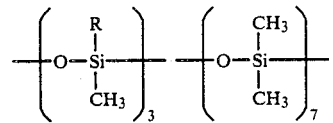

wherein R is the residium of polypropylene glycol.

10. A composition as defined in claim 1 containing an organic peroxide.

11. The crosslinked product of the composition defined in claim 10.

12. An electrical conductor having as a semi-conductive layer thereon the composition or the crosslinked product of the composition defined in claim 1.

13. The composition or the crosslinked product of the composition defined in claim 1 directly bonded to a crosslinked polyolefin substrate.

14. A composition as defined in claim 1 wherein the silicone compound is a silicone oil, a silicone rubber or a silicone copolymer and is present in an amount of 0.3 to 2.5 parts by weight.

15. A semi-conductive composition comprising an ethylene-vinyl acetate copolymer containing 15 to 30 percent by weight vinyl acetate and having a melt index of 1 to 50 g/10 min. or a chlorinated product thereof containing 3 to 40 percent by weight chlorine, carbon black, a silicone compound selected from the group consisting of silicone oils, silicone rubbers and silicone block copolymers which are liquid at normal temperatures, in an amount of about 0.3 to about 5 parts by weight and an interface crosslink inhibitor, in an amount of about 0.01 to about 1.5 parts by weight, selected from the group consisting of 2,2'-methylene-bis-(4-methyl-6-t-butyl phenol), 2,6-di-t-butyl-4-methyl phenol, 4,4'-thio-bis(6-t-butyl-2-methyl phenol), t-butyl catechol, hydroquinone, 2,5-di-t-butyl hydroquinone, 2-mercapto benzothiazole, 2,2'-thio-bis-benzothiazole, N-cyclohexyl-benzothiazole-sulfeneamide and tetramethyl thiuram disulfide.

* * * * *

UNITED STATES PATENT AND TRADEMARK OFFICE
CERTIFICATE OF CORRECTION

PATENT NO. : 4,493,787
DATED : January 15, 1985
INVENTOR(S) : Seiho Taniguchi, et al It is certified that error appears in the above-identified patent and that said Letters Patent is hereby corrected as shown below:

On the title page;

[73] "Union Carbide Corporation, Danbury, Conn." should read,
-- Nippon Unicar Company Ltd., Tokyo, Japan --

Column 2, line 62, "composition" should read -- compositions --

Columns 7 and 8, under the column entitled "Degree of crosslink; "ε" should read -- s --

Signed and Sealed this

Thirtieth Day of July 1985

[SEAL]

Attest:

DONALD J. QUIGG

Attesting Officer    Acting Commissioner of Patents and Trademarks